(12) United States Patent
Clement et al.

(10) Patent No.: US 6,223,976 B1
(45) Date of Patent: May 1, 2001

(54) PROCESS FOR THE ASSEMBLY OR REFACING OF TITANIUM ALUMINIDE ARTICLES BY DIFFUSION BRAZING

(75) Inventors: Jean-François Didier Clement, Yerres; Jean-Pierre Ferte, Corbeil Essonnes, both of (FR)

(73) Assignee: Societe Nationale d'etude et de Construction de Moteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/154,513

(22) Filed: Sep. 16, 1998

(30) Foreign Application Priority Data

Sep. 18, 1997 (FR) .................................. 97 11624

(51) Int. Cl.$^7$ .......................... B23K 31/00; B23K 31/02; B23K 20/00; B23K 28/00; B23K 1/19
(52) U.S. Cl. ...................... 228/248.5; 228/181; 228/194; 228/262.61; 228/262.72
(58) Field of Search ................................ 228/248.5, 181, 228/194, 262.61, 262.72, 262.8

(56) References Cited

U.S. PATENT DOCUMENTS

| | | | |
|---|---|---|---|
| 2,566,410 | 9/1951 | Griffin | 99/140 |
| 3,085,015 | 4/1963 | Schram | 99/118 |
| 3,787,205 * | 1/1974 | Church | 75/226 |
| 4,150,274 * | 4/1979 | Minin et al. | 219/8.5 |
| 4,294,615 | 10/1981 | Blackburn et al. | |
| 4,409,079 * | 10/1983 | Miyazaki et al. | 204/192 |
| 4,427,556 | 1/1984 | House et al. | 252/8.5 A |
| 4,538,562 * | 9/1985 | Matsui et al. | 123/90.51 |
| 4,729,504 * | 3/1988 | Edamura | 228/122.1 |
| 4,869,421 * | 9/1989 | Norris et al. | 228/181 |
| 5,063,052 | 11/1991 | Grollier et al. | 424/70 |
| 5,278,203 | 1/1994 | Harms | 523/200 |
| 5,318,214 | 6/1994 | Lucas, Jr. et al. | |
| 5,552,462 | 9/1996 | Yeh | 524/55 |
| 5,558,872 | 9/1996 | Jones et al. | 424/78.03 |
| 5,593,082 * | 1/1997 | Ivanov et al. | 228/122.1 |
| 5,605,957 | 2/1997 | Yoshida | 524/731 |
| 5,635,171 | 6/1997 | Nadaud | 424/78.03 |
| 5,728,371 | 3/1998 | Pinzon et al. | 424/59 |
| 5,728,372 | 3/1998 | Pinzon | 424/59 |
| 5,904,201 * | 5/1999 | Jackson et al. | 164/80 |

FOREIGN PATENT DOCUMENTS

| | | |
|---|---|---|
| 2037488 | 7/1993 | (CA) . |
| 0 715 845 A1 | 6/1996 | (EP) . |
| 0 481 240 B1 | 12/1996 | (EP) . |
| 0 795 320 A1 | 9/1997 | (EP) . |
| 0 795 321 A1 | 9/1997 | (EP) . |
| 0 795 322 A1 | 9/1997 | (EP) . |
| 0 795 323 A1 | 9/1997 | (EP) . |
| 0 804 923 A1 | 11/1997 | (EP) . |
| 0 804 924 A2 | 11/1997 | (EP) . |
| 0 682 936 B1 | 1/1998 | (EP) . |
| 93069498 | 1/1986 | (JP) . |

* cited by examiner

*Primary Examiner*—Patrick Ryan
*Assistant Examiner*—Zidia T. Pittman
(74) *Attorney, Agent, or Firm*—Oblon, Spivak, McClelland, Maier & Neustadt, P.C.

(57) ABSTRACT

A process for assembling titanium aluminide articles by diffusion brazing comprises the following steps:

(a) Preparation of a homogenous mixture of a titanium aluminide powder A of 40 to 90 weight % and a powder B chemically wetting A and having an appreciably lower melting point;

(b) formation of a paste by addition of an organic binder to the powder mixture;

(c) depositing the paste plumb on the assembly gap; and, (d) heating the assembly in a vacuum furnace between 1000° C. and 1300° C. for a period of from a few minutes to 6 hours.

This process is also of use for repairing and refacing titanium aluminide articles.

20 Claims, 3 Drawing Sheets

PROCESS FOR THE ASSEMBLY OR REFACING OF TITANIUM ALUMINIDE ARTICLES BY DIFFUSION BRAZING

BACKGROUND OF THE INVENTION

1. Field of the Invention

This invention relates to a process for the assembly of titanium aluminide intermetallic articles by diffusion brazing. The process is also of use for repairing or refacing such articles.

2. Summary of the Prior Art

A variety of intermetallic materials have been developed which have interesting properties and which have advantages for use in particular applications, such as aviation applications, over conventional metal alloys and superalloys. This class of materials includes TiAl or $Ti_3Al$ titanium aluminides. This invention is particularly though not exclusively concerned with these two materials. These materials are typically shaped by casting or forging. For example, U.S. Pat. No. 4,294,615 describes a TiAl material of this kind. These materials may also include different constituents, such as Nb, Mo, Si, Zr, V, Ta, etc., depending upon the required application.

However, assembling the shaped articles has hitherto proved extremely difficult.

The known assembly techniques used for conventional metal alloy and superalloy materials are unsuitable for these novel intermetallic materials. In particular, assembly processes involving fusion (with or without a filler metal) such as energy beam, electron beam, or laser beam welding or TIG electric arc or plasma processes have the disadvantage of greatly modifying the metallurgical structure of the material. This causes difficulties when fragile materials like intermetallic compounds are assembled using such fusion processes. For example, titanium aluminide articles often experience cracking or crazing because of the severe heat stresses associated with the use of these conventional processes and because of the poor ductility of the materials. In other processes such as diffusion welding and friction welding, assembly is effected in the solid state. However, diffusion welding needs mating surfaces of precise geometry and very close control over cleanliness and heat cycle conditions. Friction welding requires special rheological qualities and is unsatisfactory for some assembly configurations.

Laboratory experiments have shown that since diffusion brazing produces zero thermal stressing, assembling titanium aluminide articles by diffusion brazing avoids cracking and crazing problems. The filler metals used in this case were those conventionally used in the assembly of titanium alloy articles and are, for example, Cu, TiCu, TiNi or 15% of TiCu and 15% of Ni. However, when diffusion is used with these known parameters, this process requires strict limitations to be observed if the results are to be of acceptable quality. In particular, the assembly gap is limited to 0.1–0.2 mm and is often necessary to apply pressure during assembly. Also, it is impossible to reface any surface of significant thickness.

SUMMARY OF THE INVENTION

One of the objects of the invention is to provide a process for assembling or refacing titanium aluminide articles by diffusion brazing which is free from the disadvantages of the previous known processes and can provide a satisfactory quality standard, more particularly such as is required in aviation.

Accordingly, in a first aspect of the invention, a process for assembly titanium aluminide articles by diffusion brazing comprises the following steps:

(a) preparation of a homogenous mixture of powder A and B, powder A consisting of a titanium aluminide alloy representing a proportion of from 40 to 90 weight % of the total and powder B consisting of a titanium-based or copper-based alloy which has a melting point appreciably below the incipient melting point of powder A, which can wet powder A chemically represent a proportion of from 10 to 60 weight % of the total, said powder proportions being determined according to process performance parameters, temperature and powder grain sizes;

(b) preparation of a paste by mixing an organic binder known per se in brazing technologies with the powder mixture obtained in step (a);

(c) depositing the paste plumb on the assembly gap of the articles, and (d) heating the assembly obtained in step (c) in a vacuum furnace at a temperature between 1000° C. and 1300° C. for between a few minutes and 6 hours.

In a second aspect of the invention, a process for repairing a titanium aluminide article by diffusion brazing comprises the performing steps (a), (b) and (d) of the process just described and in the intermediate step (c), depositing the paste on the fissure of the article to be repaired.

According to a third aspect of the invention, a process for refacing at least one surface of a titanium aluminide article comprises following steps (a), (b) and (d) of the process hereinbefore described and in the intermediate step (c) depositing the paste on the surface of the article to be refaced.

An alternative refacing method is based on self-brazable compacts. According to a fourth aspect of the invention a process for making a compact element of predetermined shape of titanium aluminide comprises performing step (a) previously described, whereafter the powder mixture is placed in a mould which is homothetic to the shape of the compact end product, and which is preferably chemically inert. Step (d) is then preferably performed for a period reduced to a few minutes to avoid complete diffusion of the elements of powder B into powder A. The compact remains brazable and can be used to reface a surface.

If step (d) is carried out for a longer period of one hour, this method of making self-brazable compacts can be used to make dense shapes.

Advantageously, a powder A having a composition in atomic percentages of Al 46 to 50, Cr2, Nb2 and Ti as the remainder is used with a powder B which has a composition in weight percentages of Cu15, Ni15 and Ti as the remainder or a powder B having a composition in weight percentages of Ti30 and Cu as the remainder.

Alternatively, powder A having a composition in atomic percentages of Al 46 to 50, Mn2, Nb2 and Ti as the remainder may be used with powder B having a composition in weight percentages of Cu15, Ni15 and Ti as the remainder or a powder B having a composition in weight percentages of Ti30 and Cu as the remainder.

Depending upon uses, the predetermined grain size of the powders A and B used is either less than 63 $\mu$ or less than 150 $\mu$m.

Other characteristics and advantages of the invention will be better understood from the following description of some examples of the application of a diffusion brazing process in accordance with the invention, to titanium aluminide articles, reference being made to the accompanying drawings.

EXAMPLE 1

The butt-jointing of two titanium aluminide articles whose thickness is between 2 and 6 mm is described below. The compositions of the material forming the articles in atomic percentages is Al48, Cr2, Nb2 and Ti as the remainder.

In the first process step (a) a homogeneous mixture of powders A and B is made in a 50—50 proportion by weight. Powder A has the same composition as the articles to be assembled, such compositions comprising in atomic percentages Al48, Cr2, Nb2 and the remainder Ti. Powder B has a composition in weight percentages of CU15, Ni15 and Ti as the remainder. The grain size of the powders A and B is less than 63 $\mu$m.

In the next stage (b) a paste is made by mixing with the powder an organic binder known in brazing technologies. In the next stage (c) and as shown diagrammatically in FIG. 1, the paste 3 is deposited directly over the assembly gap 4 between the titanium aluminide articles 1, 2 disposed in an edge-to-edge relationship. Before deposition of the paste the articles 1 and 2 to be assembled are rigidly interconnected by resistance-welded titanium balls. In this example the paste is deposited by means of a syringe and the quantity deposited is approximately 2 to 4 times the volume of the assembly gap. The assembly gap in this example varies between 0 and 0.5 mm.

Figure 2:
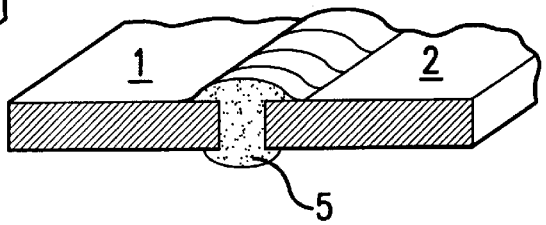
FIG. 2 shows the joint of FIG. 1 after assembly.

In the next step (d) the resulting assembly is heated in a vacuum furnace at 1260° C. for 4 hours. The assembly gap between the articles 1 and 2 is completely filled as indicated by the reference 5 in FIG. 2. The heating temperature is arranged to be above the melting point of the powder B and below the melting point of the powder A. While the temperature is maintained the deposited mixture 3 densifies as a result of capillary forces and simultaneously wets the surfaces of the articles 1 and 2 to be assembled to produce a satisfactory metallurgical bond with the articles by diffusion brazing.

Figure 1:
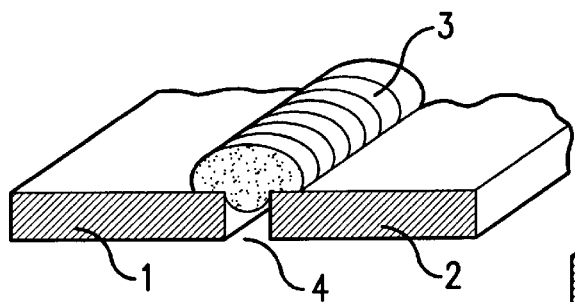
FIG. 1 is a diagrammatic perspective view of a butt joint prepared for assembly in accordance with the invention.

The gap 4 of FIG. 1 can also correspond to a crack right through the thickness of a damaged article such as a titanium aluminide shell. This may have a thickness between 2 and 6 mm and have a composition in atomic percentages of Al48, Cr2, Nb2 and Ti as the remainder. In this case the process steps hereinbefore described correspond to a process for repairing a titanium aluminide article by diffusion brazing.

Figure 3:
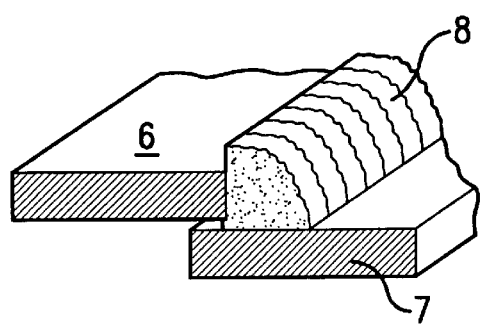
FIG. 3 is a diagrammatic perspective view of a lap joint prepared for assembly in accordance with the invention.
Figure 4:
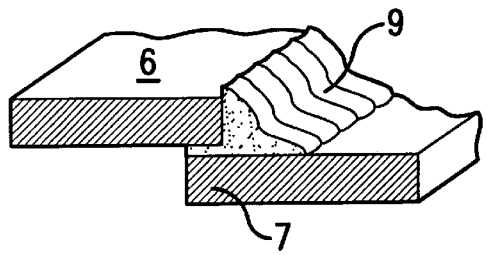
FIG. 4 shows the joint of FIG. 3 after assembly.

The assembly can also take the form of a lap joint between two titanium aluminide articles 6 and 7, as shown diagrammatically in FIGS. 3 and 4. In this case the process steps according to the invention hereinbefore described are followed identically and in step, (c) the paste 8 is deposited in the corner formed between the two articles and, as in the previous case, after heating in a vacuum furnace a bead 9 provides the metallurgical bond between the articles 6 and 7.

EXAMPLE 2

The refacing of a surface of titanium aluminide article is described below. An article 10 diagrammatically represented in FIGS. 5 and 6 is, for example, a turbomachine blade whose composition in atomic percentages is Al48, Cr2, Nb2 and Ti as the remainder.

In the first process step (a) a homogeneous mixture is prepared from a powder A having the same composition as the article 10 and comprising in atomic percentages Al48, Cr2, Nb2 and Ti as the remainder and a powder B having a composition in weight percentages of Cu15, Ni15 and Ti as the remainder. The grain size of the powders is less than 63 $\mu$m. The mixture is prepared in weight proportions of 60% of powder A and 40% of powder B.

In the next step (b) a paste is made by mixing with the powder an organic binder known in brazing technologies.

Figure 5:
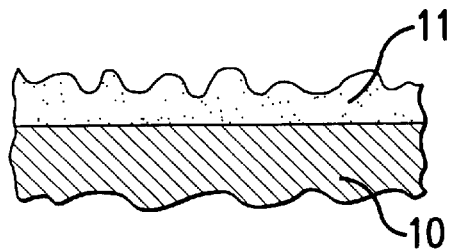
FIG. 5 is a partial, diagrammatic, sectional view of a blade tip which is being refaced using a process in accordance with the invention.
Figure 6:
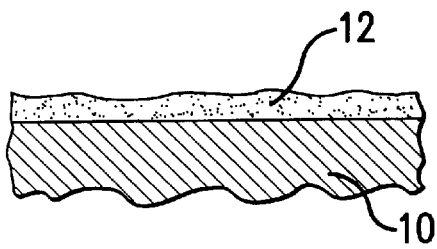
FIG. 6 shows the article of FIG. 5 after refacing.

In the next step (c) and as diagrammatically shown in FIG. 5, the paste is deposited on the blade tip to be refaced by means of a syringe in a number of passes so as to obtain a deposit 11 which is approximately 3 mm thick and which projects considerably beyond the surfaces of the blade 10.

Figure 7:
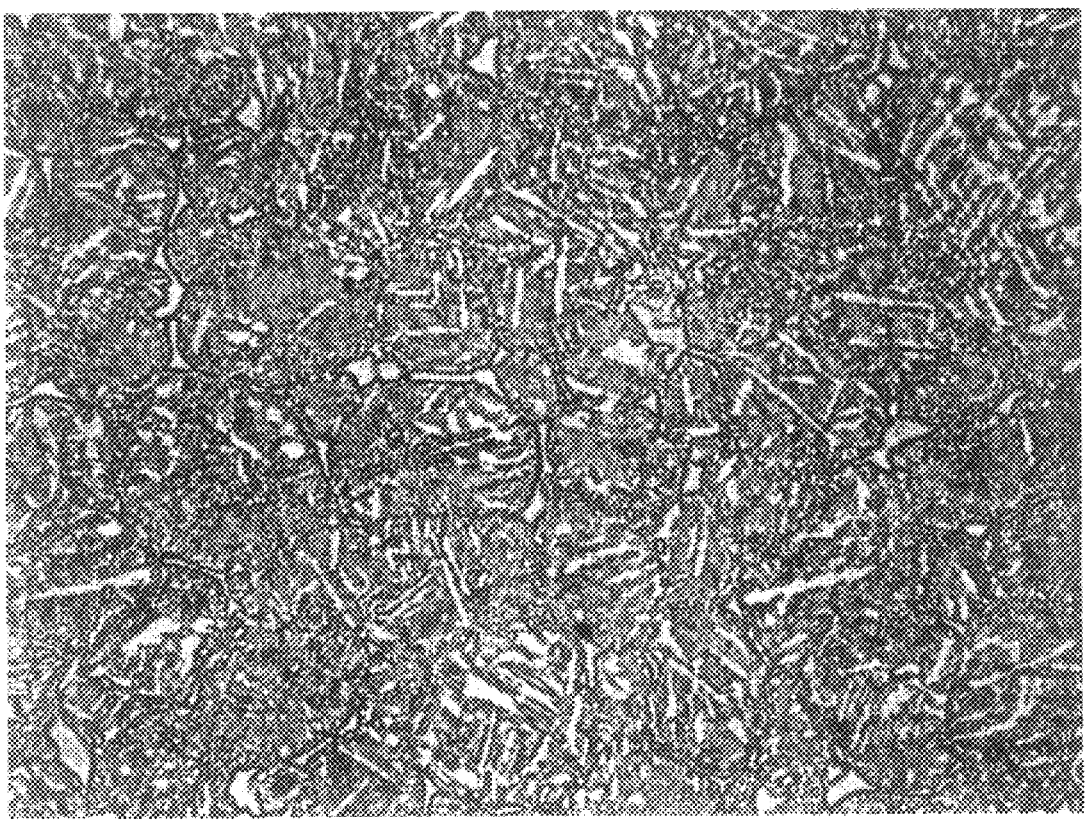
FIG. 7 is a structural microphotograph obtained after the refacing shown in FIGS. 5 and 6.

In the next step (d) the assembly is heated in a vacuum furnace at 1260° C. for 4 hours. The mixture is completely densified and a metallurgical bond is produced between the deposit 12 and the substrate formed by the article 10, as diagrammatically shown in FIG. 6. FIG. 7 shows the resulting metallurgical micro structure. An appropriate final machining can be given to finish the tip of the blade 10.

As a variant, in step (c) the deposition can be made by other means such as plasma torch spraying or by associating a powder feed with a high-energy beam such as a laser.

Figure 8:
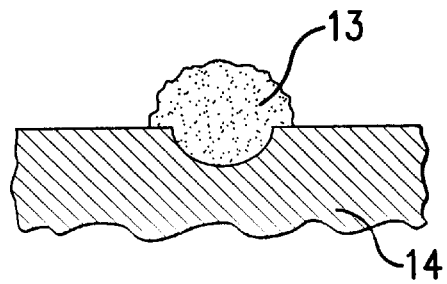
FIG. 8 is a partial, diagrammatic, sectional view showing the repair of a local fault in an article by a process in accordance with the invention.
Figure 9:
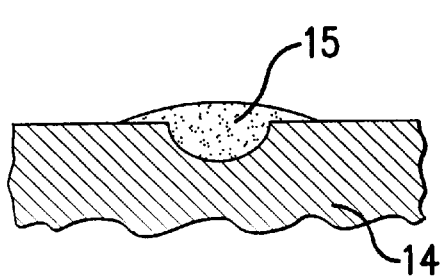
FIG. 9 shows the article of FIG. 8 after repair.

Surface refacing of a titanium aluminide article as just described can be effected on a new article during manufacture or, as in the case of the blade 10 described with reference to FIGS. 5 and 6 in which the refaced surface can be a worn blade tip, the refacing can be carried out on a used article. The refacing can also be used to repair a surface having a shape defect, as in the example shown in FIGS. 8 and 9. After the paste 13 has been deposited on the article 14 a repair is obtained at 15 and again finished by surface machining or polishing.

EXAMPLE 3

In this example, the manufacture of a compact titanium aluminide element of a particular shape is described. As previously described in Examples 1 and 2, in the first step (a) a homogeneous mixture of powders A and B is made in a proportion of 60 weight % of powder A and 40 weight % powder B. Powder A has a composition in weight percentages of Cu15, Ni15 and the remainder Ti. Powder B has a composition in atomic percentages of Al48, Cr2, Nb2 and Ti as the remainder Ti. The grain size of powders A and B is less than 63 μm.

Figure 10:
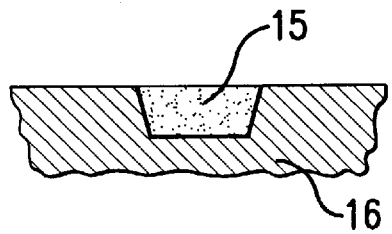
FIG. 10 is a diagrammatic sectional view showing a stage in the making of a compact titanium aluminide element in accordance with the invention.

In the next step (b) and as diagrammatically shown in FIG. 10, the powder mixture 15 prepared in step (a) is placed in an alumina mould 16 whose hollow shape is similar to the external shape of the required compact element but larger by a factor of approximately 110%.

In the next step (c) the assembly obtained in step (b) is heated in a vacuum furnace at 1260° C. for 4 hours.

In all cases, the material of which the mould 16 is made is chemically inert in respect of the titanium aluminide material. In step (c) raising the heating temperature leads to maximum densification, in which event the resulting compact element 17 can be a finish-shaped article of titanium aluminide which does not require further processing.

Figure 11:
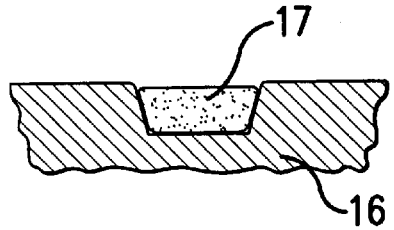
FIG. 11 is a view similar to FIG. 10 showing a later stage in the making of the element.
Figure 12:
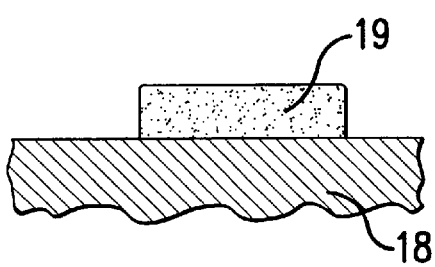
FIG. 12 is a diagrammatic sectional view showing an article being refaced using a self-brazable compact in accordance with the invention.
Figure 13:
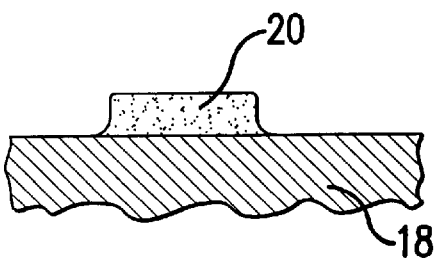
FIG. 13 shows the article of FIG. 12 after refacing.

For other applications, in step (c) a heating temperature appreciably below the complete densification temperature is used. This operation leads to high but incomplete densification and to a reduction in volume leading to a compact element 17 of a shape substantially similar to the shape of the mould 16, as shown in FIG. 11. In this event the resulting compact element 17 retains a residual capacity for self-brazing to a surface of a titanium aluminide article when heated to the full densification temperature. The compact element 17 can therefore be used as a self-brazable, sintered element. FIGS. 12 and 13 thus show a diagrammatic example of refacing an article 18 from a self-brazable, sintered element 19. The element 19, whose dimensions are adapted to the surface to be refaced, is deposited on that surface of the new or used article 18 which it is required to reface, whereafter the sintered element 19 is rigidly connected to the article 18 by way of one or more resistance weld points. The assembly is then heated in a vacuum furnace at the full densification temperature of from 1000° C. to 1300° C., depending on the predetermined composition of the sintered mixture. This leads in addition to extra densification, to a metallurgical bond between the sintered element 20 and the article 18. The period over which the temperature is maintained may be varied from a few minutes to several hours depending upon the particular composition of the mixture and the required level of chemical homogenisation. The refacing can be adjusted by final machining adapted to the function of the article 18.

What is claimed is:

1. A process for assembling titanium aluminide articles by diffusion brazing comprising the following steps:
    (a) preparing a homogenous mixture of powder A and B, powder A consisting of a titanium aluminide alloy representing a proportion of from 40 to 90 weight % of the total and powder B consisting of a titanium-based or copper-based alloy which has a melting point appreciably below the incipient melting point of powder A, which can wet powder A chemically and which represents a proportion of from 10 to 60 weight % of the total, said powder proportions being determined depending on process performance parameters, temperature and powder grain sizes;
    (b) preparing a paste by mixing an organic binder with the powder mixture obtained in step (a);
    (c) depositing the paste directly above an assembly gap between the articles, and
    (d) heating the assembly obtained in step (c) in a vacuum furnace at a temperature between 1000° C. and 1300° C.

2. A process for repairing a titanium aluminide article by diffusion brazing comprising the following steps:
    (a) preparing a homogenous mixture of powder A and B, powder A consisting of a titanium aluminide alloy representing a proportion of from 40 to 90 weight % of the total and powder B consisting of a titanium-based or copper-based alloy which has a melting point appreciably below the incipient melting point of powder A, which can wet powder A chemically and which represents a proportion of from 10 to 60 weight % of the total, said powder proportions being determined depending on process performance parameters, temperature and grain powder sizes;
    (b) preparing a paste by mixing an organic binder with the powder mixture obtained in step (a);
    (c) depositing the paste directly above the fissure of the article to be repaired, and
    (d) heating the assembly obtained in step (c) in a vacuum furnace at a temperature between 1000° C. and 1300° C.

3. A process for refacing at least one surface of a titanium aluminide article comprising the following steps:
    (a) preparing a homogenous mixture of powder A and B, powder A consisting of a titanium aluminide alloy representing a proportion of from 40 to 90 weight % of the total and powder B consisting of a titanium-based or copper-based alloy which has a melting point appreciably below the incipient melting point of powder A, which can wet powder A chemically and which represents a proportion of from 10 to 60 weight % of the total, said powder proportions being determined depending on process performance parameters, temperature and powder grain sizes;
    (b) preparing a paste by mixing an organic binder with the powder mixture obtained in step (a);
    (c) depositing the paste on the surface of the article to be refaced, and
    (d) heating the assembly obtained in step (c) in a vacuum furnace at a temperature between 1000° C. and 1300° C.

4. A process for refacing at least one surface of a titanium aluminide article according to claim 3, wherein the paste is deposited in step (c) by means of a syringe.

5. A process for refacing at least one surface of a titanium aluminide article according to claim 3, in which in step (c) the paste is deposited by means of plasma torch spraying.

6. A process for refacing at least one surface of a titanium aluminide article according to claim 3, in which in step (c) the paste is deposited by spraying by means of a powder feed assisted by a high-energy beam such as a laser.

7. A process for making a compact element of predetermined shape of titanium aluminide comprising the following steps:
    (a) preparing a homogenous mixture of powder A and B, powder A consisting of a titanium aluminide alloy representing a proportion of from 40 to 90 weight % of the total and powder B consisting of a titanium-based or copper-based alloy which has a melting point appreciably below the incipient melting point of powder A, which can wet powder A chemically and which represents a proportion of from 10 to 60 weight % of the total, said powder proportions being determined depending on process performance parameters, temperature and powder grain sizes;
    (b) placing the mixture of powders obtained in step (a) in a mould homothetic to the shape of the compact end products and, (c) heating the assembly obtained in step (b) in a vacuum furnace at a temperature between 1000° C. and 1300° C.

8. A process for refacing at least one surface of a titanium aluminide article using a compact element obtained in accordance with claim 7 comprising the steps of:
   (a) positioning and fixing said compact element on the surface to be refaced; and
   (b) heating the assembly obtained in step (a) to a temperature between 1000° C. and 1300° C. in a vacuum furnace.

9. A process for assembling titanium aluminide articles by diffusion brazing according to claim 1, wherein powder A has a composition in atomic percentages of Al 46 to 50, Cr2, Nb2 and Ti as the remainder, and powder B has a composition in weight percentages of Cu 10 to 15, Ni 10 to 15 and Ti as the remainder.

10. A process for assembling titanium aluminide articles by diffusion brazing according to claim 1, wherein powder A has a composition in atomic percentages of Al 46 to 50, Cr2, Nb2 and Ti as the remainder, and powder B has a composition in weight percentages of Ti30 and Cu as the remainder.

11. A process for assembling titanium aluminide articles by diffusion brazing according to any of claims 1, 9 or 10, in which powders A and B have a grain size of less than 63 μm.

12. A process for assembling titanium aluminide articles by diffusion brazing according to any of claims 1, 9 or 10, in which powders A and B have a grain size of less than 150 μm.

13. A process for repairing a titanium aluminide article by diffusion brazing according to claim 2, in which powder A has a composition in atomic percentages of Al 46 to 50, Cr2, Nb2, and Ti as the remainder, and powder B has a composition in weight percentage of Cu 10 to 15, Ni 10 to 15 and Ti as the remainder.

14. A process for repairing a titanium aluminide article by diffusion brazing according to claim 2, in which powder A has a composition in atomic percentages of Al 46 to 50, Cr2, Nb2, and Ti as the remainder, and powder B has a composition in weight percentage of Ti30 and Cu as the remainder.

15. A process for repairing a titanium aluminide article by diffusion brazing according to any one of claims 2, 13 or 14 in which powders A and B have a grain size of less than 63 μm.

16. A process for repairing a titanium aluminide article by diffusion brazing according to any one of claims 2, 13 or 14 in which powders A and B have a grain size of less than 150 μm.

17. A process for refacing at least one surface of a titanium aluminide article according to any of claims 3 to 6 or 8, in which powder A has a composition in atomic percentages of Al 46 to 50, Cr2, Nb2 and Ti as the remainder, and powder B has a composition in weight percentages of Cu10 to 15, Ni10 to 15 and Ti as the remainder.

18. A process for refacing at least one surface of a titanium aluminide article according to any of claims 3 to 6 or 8, in which powder A has a composition in atomic percentages of Al 46 to 50, Cr2, Nb2 and Ti as the remainder, and powder B has a composition in weight percentages of Ti30 and Cu as the remainder.

19. A process for refacing at least one surface of a titanium aluminide article according to any of claims 3 to 6 or 8, in which powders A and B have a grain size of less than 63 μm.

20. A process for refacing at least one surface of a titanium aluminide article according to any one of claims 3 to 6 or 8, in which powders A and B have a grain size of less than 150 μm.

* * * * *

UNITED STATES PATENT AND TRADEMARK OFFICE
CERTIFICATE OF CORRECTION

PATENT NO. : 6,223,976 B1
DATED : May 1, 2001
INVENTOR(S) : Jean-François Didier Clement et al.

It is certified that error appears in the above-identified patent and that said Letters Patent is hereby corrected as shown below:

Column 2,
Line 16, "known per se in" should read -- known per se in --.
Line 60, "than 63 $\mu$ or" should read -- than 63 $\mu$m or --.

Signed and Sealed this

Sixth Day of September, 2005

JON W. DUDAS
*Director of the United States Patent and Trademark Office*